US011838814B2

(12) United States Patent
Chang et al.

(10) Patent No.: US 11,838,814 B2
(45) Date of Patent: Dec. 5, 2023

(54) HANDOVER MANAGEMENT WITH CONDITIONAL HANDOVER IN COMMUNICATION SYSTEMS USING UNLICENSED FREQUENCY BANDS

(71) Applicant: Kyocera Corporation, Kyoto (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 375 days.

(21) Appl. No.: 17/262,117

(22) PCT Filed: Aug. 6, 2019

(86) PCT No.: PCT/US2019/045230
§ 371 (c)(1),
(2) Date: Jan. 21, 2021

(87) PCT Pub. No.: WO2020/033360
PCT Pub. Date: Feb. 13, 2020

(65) Prior Publication Data
US 2021/0352544 A1 Nov. 11, 2021

Related U.S. Application Data

(60) Provisional application No. 62/716,713, filed on Aug. 9, 2018.

(51) Int. Cl.
*H04W 36/00* (2009.01)
*H04W 36/30* (2009.01)
(Continued)

(52) U.S. Cl.
CPC . *H04W 36/00837* (2018.08); *H04W 36/0079* (2018.08); *H04W 36/08* (2013.01); *H04W 36/30* (2013.01); *H04W 76/27* (2018.02)

(58) Field of Classification Search
USPC .......................... 455/436–444; 370/331–333
See application file for complete search history.

(56) References Cited

U.S. PATENT DOCUMENTS

2017/0048738 A1  2/2017  Wang et al.
2019/0387440 A1* 12/2019  Yiu ..................... H04W 36/165

FOREIGN PATENT DOCUMENTS

KR   10-2016-0094876 A   8/2016
WO   2018-106429 A1      6/2018

OTHER PUBLICATIONS

Ericsson; "Connected mode mobility in NR-U", R2-1810400; 3GPP TSG-RAN WG2 AH 1807; Jun. 21, 2018; Montreal, CA.
(Continued)

*Primary Examiner* — Suhail Khan

(57) ABSTRACT

Handovers in a New Radio-Unlicensed Standalone (NR-U SA) communication system are managed by invoking one of a plurality of handover procedures based on conditions related to the communication device and channel status. One example of one of the plurality of handover procedures includes providing a conditional handover command associated with a handover time period established by the serving gNB. After determining an unlicensed channel is unoccupied, the UE device transmits a measurement report over the unlicensed channel to the serving gNB. The serving gNB transmits the conditional handover command associated with the handover time period.

24 Claims, 7 Drawing Sheets

(51) Int. Cl.
H04W 76/27 (2018.01)
H04W 36/08 (2009.01)

(56) References Cited

OTHER PUBLICATIONS

Nokia, Nokia Shanghai Bell; "Mobility and RRM for NR-based access to Unlicensed Spectrum", R2-1807147; 3GPP TSG-RAN WG2 Meeting #102; May 10, 2018; Busan, KR.

* cited by examiner

HANDOVER MANAGEMENT WITH CONDITIONAL HANDOVER IN COMMUNICATION SYSTEMS USING UNLICENSED FREQUENCY BANDS

CLAIM OF PRIORITY

The present application claims the benefit of priority to Provisional Application No. 62/716,713, entitled "Method For Mobility Control In A Standalone New Radio—Unlicensed Network", filed Aug. 9, 2018, assigned to the assignee hereof and hereby expressly incorporated by reference in its entirety.

FIELD

This invention generally relates to wireless communications and more particularly to handover management in communication systems using unlicensed frequency bands.

BACKGROUND

Wireless technologies, such as WiFi and Bluetooth, utilize unlicensed frequency bands for communication. In the United States, the unlicensed bands are located in at least the 900 MHz, 2.4 GHz and 5.8 GHz frequency bands. Some communication technologies that have traditionally operated within licensed frequency bands are beginning to use unlicensed bands for some communication. For example, the 3rd Generation Partnership Project (3GPP) has developed Licensed-Assisted Aggregation (LAA) to make use of the free unlicensed bands in conjunction with the licensed band. LAA is very similar to Carrier Aggregation (CA) whereby user equipment (UE) devices can simultaneously access multiple cells at the same time using a primary cell (PCell) and a secondary cell (SCell). The SCell which is typically a small cell, handles much of the broadband load and the PCell which is typically a macro-cell, handles the control signaling. The UE devices do not experience unnecessary increase in handover failures when moving from one small cell to another. As long as the UE device remains connected to the PCell (typically a macro-cell), the UE devices do not declare handover failure even if the connection to the SCell is lost. LAA is designed for fair coexistence among LAA networks deployed by different operators and other non-3GPP technologies. AS a result, 3GPP requires a listen-before-talk (LBT) procedure which is defined as a mechanism by which an equipment applies a clear channel assessment (CCA) check or LBT check before using the unlicensed channel.

A newly developing technology studied by the 3GPP and referred to as New Radio-Unlicensed Standalone (NR-U SA) proposes an NR-based cell operating standalone in unlicensed spectrum and connected to a 5G core network (5G-CN) with priority on frequency bands above 6 GHz. With this system, there is no longer an anchor cell (PCell) that is transmitting in a licensed band. As a result, control signaling for mobility is performed over unlicensed bands.

SUMMARY

Handovers in a New Radio-Unlicensed Standalone (NR-U SA) communication system are managed by invoking one of a plurality of handover procedures based on conditions related to the communication device and channel status. One example of one of the plurality of handover procedures includes providing a conditional handover command associated with a handover time period established by the serving gNB. After determining an unlicensed channel is unoccupied, the UE device transmits a measurement report over the unlicensed channel to the serving gNB. The serving gNB transmits the conditional handover command associated with the handover time period.

DETAILED DESCRIPTION

Figure 1:
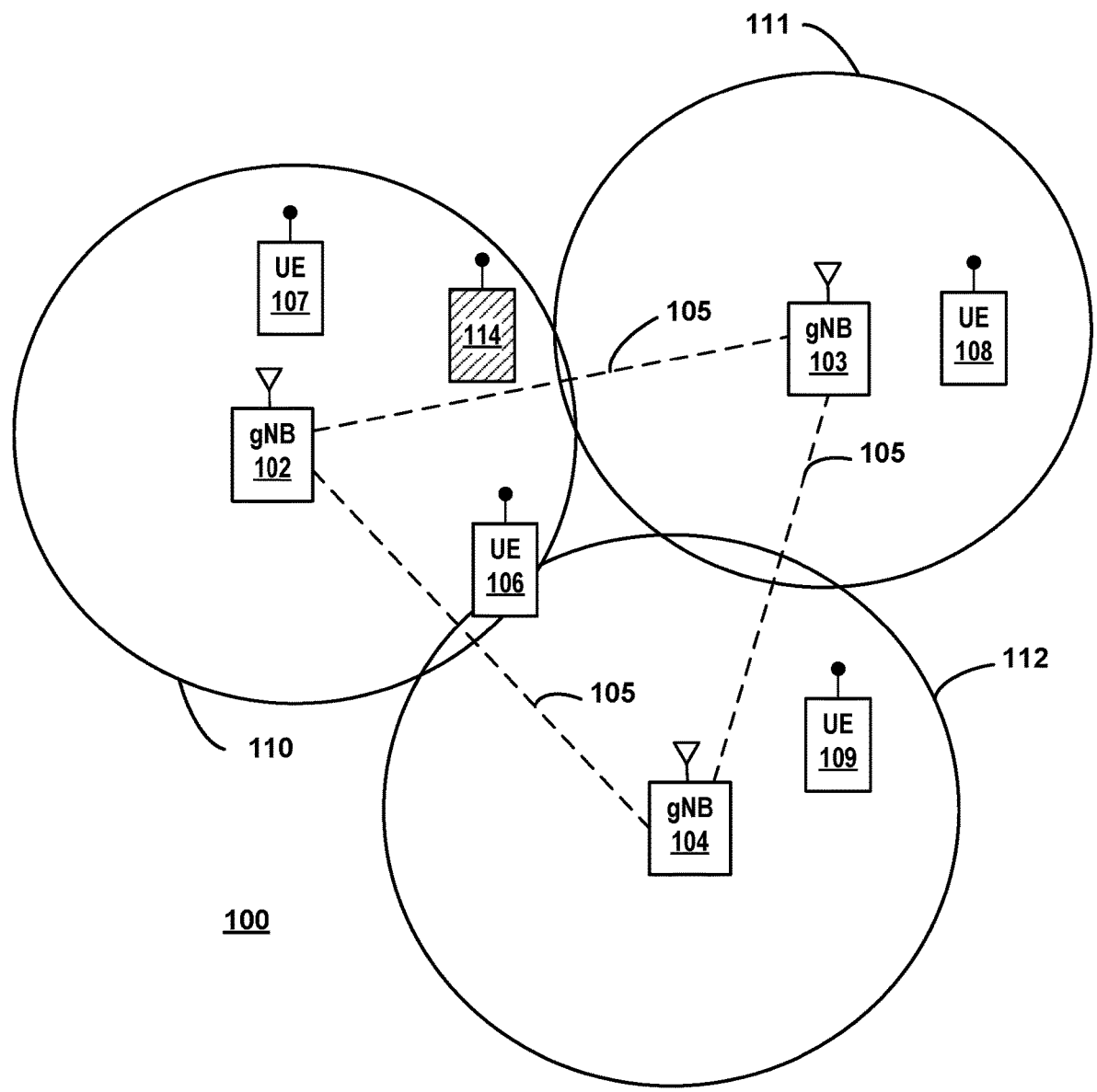
FIG. 1 is a block diagram of an example of a communication system supporting operation in accordance with 3GPP New Radio-Unlicensed Standalone (NR-U SA) with dynamic mobility management.

As discussed above, in a NR-U SA system, control signaling for mobility is performed over unlicensed bands. Since the unlicensed band may be occupied and the UE device must perform LBT procedures prior to any transmission, the UE device may not be able to send the required control signaling in a timely manner. Therefore, one of the distinct differences between LAA and NR-U SA is the lack of a reliable channel for delivery of control signaling critical to reliable operation. Due to the need for LBT operation for every signaling transmission, the reliability and latency of the control signaling may be significantly impacted due to mobility operation in the unlicensed band. Currently, the NR mobility procedure is designed to combat radio link problems and/or interference from neighboring cells but is not equipped to handle the lack of a reliable channel due to channel occupancy by other systems and devices. In particular, handovers are challenging since the existing NR based mobility is largely based on LTE with the assumption that licensed spectrum will be used for control signaling. It is difficult to determine whether a signaling failure is due to radio link issues or whether the channel is just temporary occupied. This issue is especially critical under mobility since it is expected that handovers are completed prior to T310 expiry once the UE device receives N310 consecutive out-of-sync indications from the lower layer. With current systems, upon T310 expiry, the UE device will transition to the IDLE state regardless of whether the cause of the physical layer problem was due to radio link issue or an occupied channel.

For the examples discussed herein, handovers are managed by invoking one of a plurality of handover procedures based on conditions related to the communication device and channel status. Examples of conditions that may be evaluated to select a particular handover procedure may be based on whether the unlicensed channel is occupied, the UE device's power consumption status, mobility status (whether the UE device is stationary or moving), whether the UE device requires to operate in a licensed band due to a requirement for critical communication service, and combinations thereof.

As discussed below, one example of the plurality of handover procedures includes providing a conditional handover command associated with a handover time period established by the serving gNB. After determining an unlicensed channel is unoccupied, the UE device transmits a measurement report over the unlicensed channel to the serving gNB. The serving gNB transmits the conditional handover command associated with the handover time period.

Another example of the plurality of handover procedures includes sending a handover command with an inactivity indicator to the UE device where the UE device transitions to an Inactive State (such as RRC_INACTIVE) in response to a handover failure (HOF) resulting from an occupied unlicensed channel. By sending the UE to the Inactive state upon handover failure, the UE device will avert from declaring radio link failure (RLF) if the UE device cannot find an unoccupied target cell prior to T311 timer expiry. While the UE device is in the Inactive state, the UE's context is kept at both the source gNB and the UE device which enables quick reconnection once an unlicensed channel becomes available. Where the UE device declares RLF and transitions to IDLE, the UE context will be lost and service will need to be established as a new connection. Once the UE device is able to camp on a cell with unoccupied unlicensed channel, the UE device may proceed with the connection re-establishment procedure to transition from RRC_INACTIVE to RRC_CONNECTED where the UE device provides the I-RNTI allocated by the last serving gNB when resuming from the RRC_INACTIVE. The target gNB uses the I-RNTI to retrieve the UE context from the last serving gNB. As long as the UE device selects a target cell that is within the RNA, the target gNB should be able to retrieve the information. Therefore, unlike the timer for re-establishment, the UE device may resume the connection when the previously occupied channel becomes unoccupied.

FIG. 1 is a block diagram of an example of a communication system 100 supporting operation in accordance with 3GPP New Radio-Unlicensed Standalone (NR-U SA) with dynamic mobility management. For New Radio-Unlicensed standalone deployments, mechanisms for inter-cell handover between NR-U and NR-U and Inter-RAT handover between NR-U and LTE are needed. Extensions of mobility-related measurement reporting for unlicensed operation including channel occupancy indication and RSSI measurements will also be required. The communication system 100, therefore, may operate in accordance with one or more revisions of the 3GPP NR-U SA communication specification and includes mechanisms for managing handover failures due to occupied unlicensed channels. The communication system 100 includes a plurality of base stations 102-104 providing wireless service to UE devices 106-109 within coverage areas 110-112. The UE devices 106-108 communicate with the base stations in one or more unlicensed frequency bands. In some case, one or more unlicensed frequency channels belonging to the same or different bands may be used at each of the based stations 102-104. Furthermore, the unlicensed frequency channels may be provided to each UE device simultaneously using carrier aggregation.

Therefore, the UE devices 106-108 transmit uplink signals in an unlicensed frequency band and receive downlink signals in an unlicensed frequency band. Typically, the same unlicensed frequency band is used for uplink and downlink although different bands can be used in some situations. An unlicensed frequency band is any frequency band that does not require the operator to file directly with a governmental agency regulating frequency spectrum, such as the Federal Communications Commission (FCC), in order to use the band. Examples of unlicensed frequency bands U.S. include the 900 MHz, 2.4 GHz and 5.8 GHz. Currently developing systems contemplate using at least the 6 GHz band which in the U.S. ranges between 5925 MHz and 7125 MHz and between 5925 MHz and 6425 MHz, in Europe. Portions of bands can also be used. The range 5150-5925 MHz, or parts thereof, is potentially available for license-assisted access to unlicensed operation bands. This frequency range can be operated under a license-exempt regime or ISM but must be shared with existing mobile services and other incumbent services. The quality of service offered by a licensed regime, therefore, cannot be matched. Hence, unlicensed access is viewed as complementary, and does not reduce the need for additional allocations for licensed operation in view of the increased demand for wireless broadband access. Other unlicensed frequency bands and portions of frequency bands can also be used. For the examples, herein, operation in the unlicensed frequency bands requires listen-before-talk (LBT) where a transmitting device must observe a channel to determine that is not in use before transmitting in that channel.

The base stations 102-104 are any transceivers that provide wireless service in a coverage area and can perform the functions described herein. The base stations 102-104 may be referred to as access points, access nodes, transceiver nodes, eNodeB, eNB, gNB and other terms depending on the particular system and application. For the example, the base stations 102-104 are in communication with each other through a backhaul 105 which may include wired and/or wireless portions.

For the example of FIG. 1, a UE device 106 is receiving wireless service from a first base station (first gNB) 102 where conditions change sufficiently to warrant a handover to a second base station 104. For the example, the UE device 106 transmits a measurement report to the first base station when the uplink channel for transmission is clear. Therefore, the UE device 106 performs a listen-before-talk (LBT) procedure and determines when the channel is clear. The UE device 106 may measure an energy level present in the channel and compare the measured level to a threshold over a specified time period to determine if the channel is occupied. The channel may be occupied by other UE devices operating in the system 100 or by other devices 114 using the unlicensed band that are not communicating within the system 100.

Figure 2:
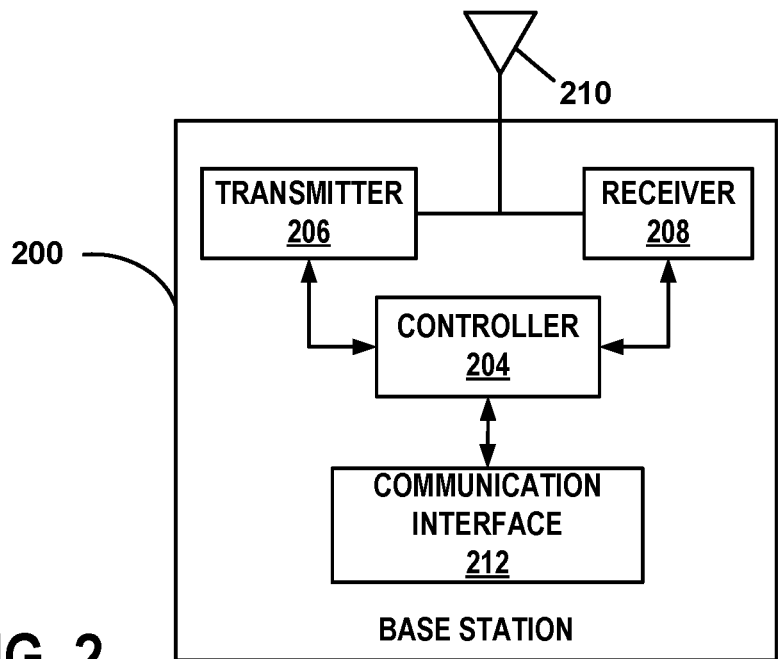
FIG. 2 is a block diagram of an example of a base station suitable for use as each of the base stations.

FIG. 2 is a block diagram of an example of a base station 200 suitable for use as each of the base stations 102-104. The base station 200 includes a controller 204, transmitter 206, and receiver 208, as well as other electronics, hardware, and code. The base station 100 is any fixed, mobile, or portable equipment that performs the functions described herein. The various functions and operations of the blocks described with reference to the base stations 102-104, 200 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location. Accordingly, the base station 200 may be a portable user device such as a communication device in some circumstances. Although the base station may be referred to by different terms, the base station is typically referred to as a gNodeB or gNB when operating in accordance with one or more communication specifications of the 3GPP directed to (NR-U SA) operation.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

For the example, the base station 200 includes a communication interface 212 for transmitting and receiving messages with other base stations. The communication interface 212 may be connected to a backhaul or network enabling communication with other base stations. In some situations, the link 116 between the base stations 112, 114 may include at least some wireless portions. The communication interface 212, therefore, may include wireless communication functionality and may utilize some of the components of the transmitter 206 and/or receiver 208.

The base station 200 has the capability to observe one or more downlink channels to determine if the channel is currently occupied. In other words, the base station 200 can determine whether other devices are transmitting within the channel. For the examples herein, the receiver 208 detects energy within the channel and the controller makes a determination of whether the measured energy indicates the channel is in use. For example, the measured energy can be compared to a threshold. Other techniques can be used in some circumstances.

Figure 3:
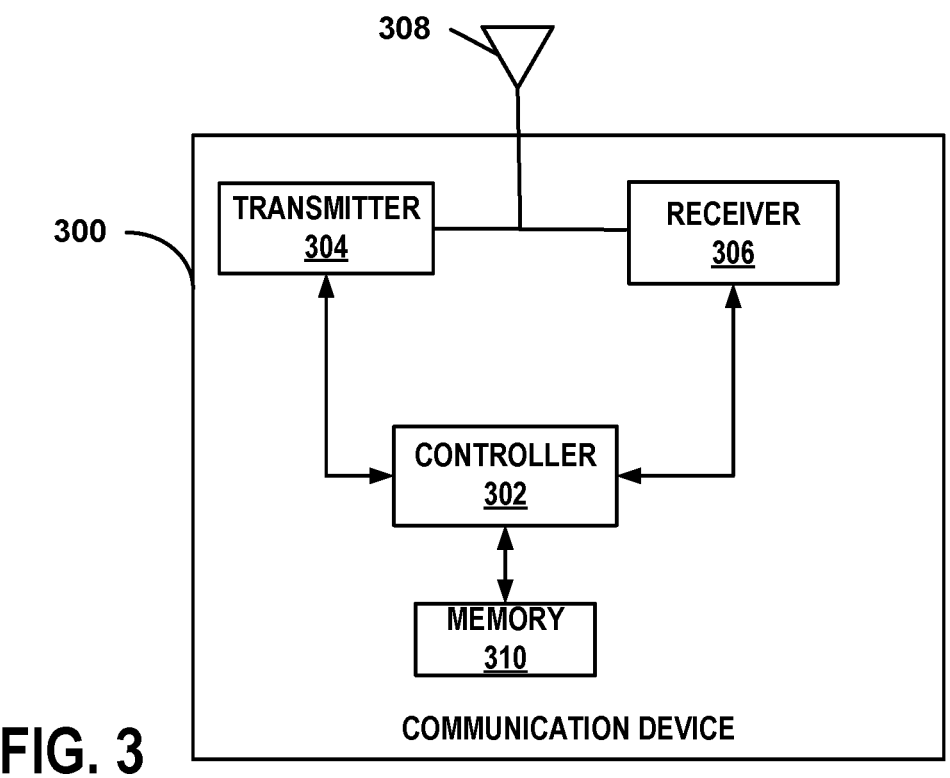
FIG. 3 is a block diagram of an example of a UE communication device suitable for use as each of the communication devices of FIG. 1.

FIG. 3 is a block diagram of an example of a UE communication device 300 suitable for use as each of the communication device 106-109 of FIG. 1. In some examples, the communication device 300 is any wireless communication device such as a mobile phone, a transceiver modem, a personal digital assistant (PDA), a tablet, or a smartphone. In other examples, the communication device 300 is a machine type communication (MTC) communication device or Internet-of-Things (IOT) device. The communication device 300, (106-109), therefore is any fixed, mobile, or portable equipment that performs the functions described herein. The various functions and operations of the blocks described with reference to communication device 300 may be implemented in any number of devices, circuits, or elements. Two or more of the functional blocks may be integrated in a single device, and the functions described as performed in any single device may be implemented over several devices.

The communication device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 304 and transmitter 306 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 304, therefore, may include components such as low noise amplifiers (LNAs) and filters. The transmitter 306 may include filters and amplifiers. Other components may include isolators, matching circuits, and other RF components. These components in combination or cooperation with other components perform the communication device functions. The required components may depend on the particular functionality required by the communication device.

The transmitter 306 includes a modulator (not shown), and the receiver 304 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

The UE communication device 300 has the capability to observe one or more uplink channels to determine if the channel is currently occupied. In other words, the UE communication device 300 can determine whether other devices are transmitting within the channel. For the examples herein, the receiver 304 detects energy within the channel and the controller makes a determination of whether the measured energy indicates the channel is in use. For example, the measured energy can be compared to a threshold. Other techniques can be used in some circumstances.

Figure 4:
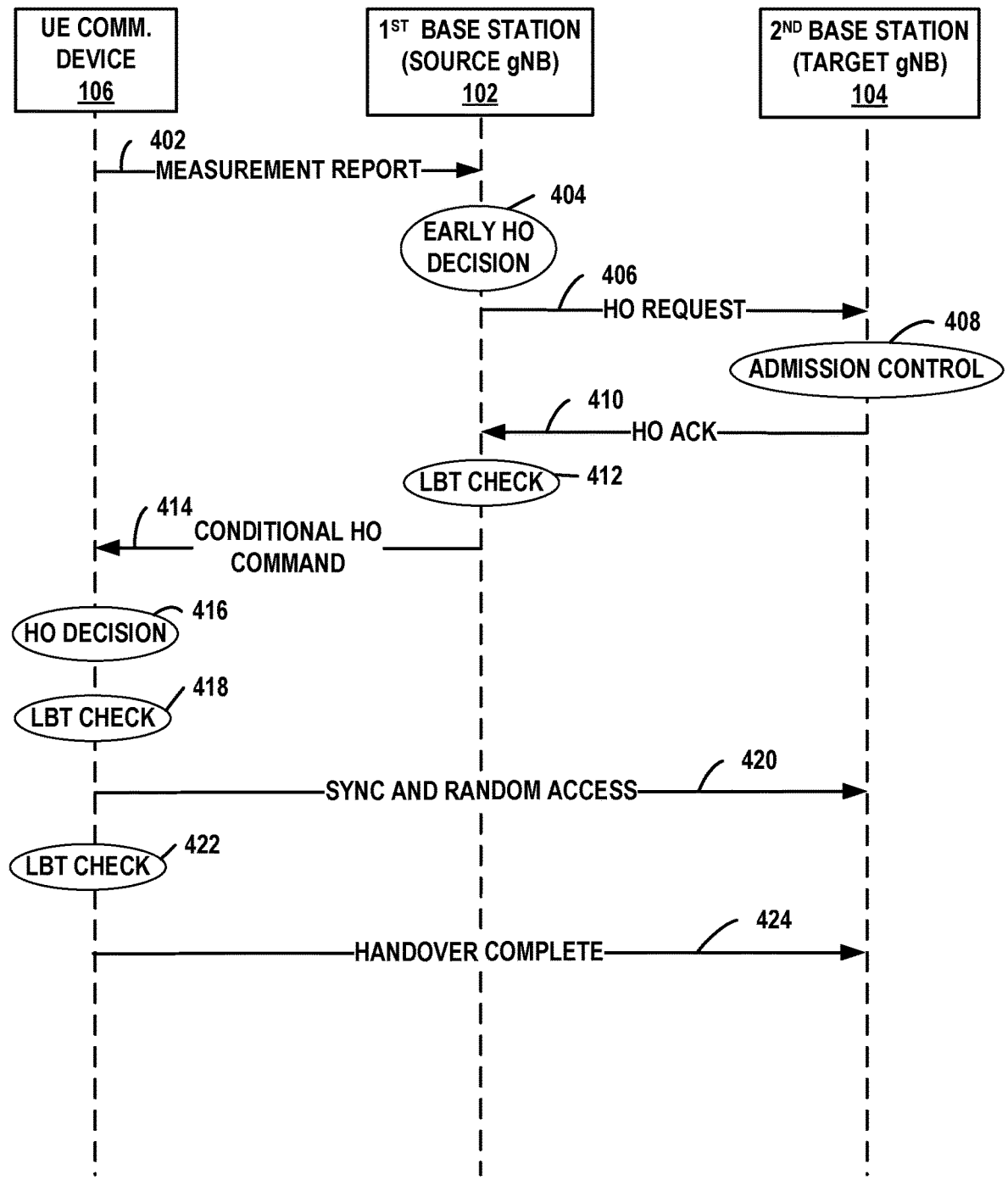
FIG. 4 is a timing diagram of communication for an example where a conditional handover is authorized by the first base station in a communication system utilizing unlicensed frequency bands for transmission.

FIG. 4 is a timing diagram of communication for an example where a conditional handover is authorized by the first base station 102 in a communication system utilizing unlicensed frequency bands for transmission. The example of FIG. 4 begins with the UE communication device 106 sending a measurement report at transmission 402. After measuring the appropriate channel parameters and determining the unlicensed uplink channel is clear, the UE device 402 sends the measurement report to the first base station 102 which is the serving base station in the example. In some circumstances, the UE device 106 determines if measurement report trigger criteria have been met before transmitting the measurement report is transmitted. Examples of such evaluations and criteria are discussed below.

At event 404, the first base station 102 performs an early handover decision. To support an early handover decision, the first base station 102 must prepare all potential target base stations. This preparation includes sending the target base stations the UE's context as well as the Admission Control procedure 408. This is necessary since the UE device 106 is not ready to perform a handover at that time. Therefore, any one of the prepared target base stations can potentially become the base station to which the UE device 106 is handed over.

At transmission 406, the first base station 102 sends a handover request to the second base station 104 which is the target base station. For the example, communication between the base stations is through the backhaul 105 which does not utilize the unlicensed channels.

At event 408, the second bases station performs admission control. The admission control procedure admits or rejects the establishment requests, including handovers for new radio bearers. In order to do this, admission control takes into account the overall resource situation in the network, the QoS requirements, the priority levels and the provided QoS of in-progress sessions and the QoS requirement of the new radio bearer request.

At transmission 410, the second base station sends a handover acknowledgment to the first base station. The target base station sends the handover acknowledgement after the required resources for all accepted radio bearers are allocated. If no resources are available on the target side, the target eNB responds with the handover NACK message or the handover failure message instead.

At event 412, the first base station performs an LBT procedure by observing the unlicensed downlink channel to determine if it is occupied. When the channel is unoccupied, the first base station transmits a conditional handover command to the UE device at transmission 414. The conditional handover command indicates that a handover is authorized for a limited time period. For the example, the conditional handover command includes a time period indicator that indicates the length of the time period. In some situations, the time period indicator may include information that directly indicates the time period. In other situations, the time period indicator may include a reference value that corresponds to a time period and that can be associated with the time period by the UE device. In still other situations, there may be a single preconfigured time period that is used when the conditional handover command is received by the UE device. The time period may be configured to the UE device via dedicated signaling or system information. The time period is selected such that it is long enough to allow the UE device sufficient time to complete the handover when the channel to the second base station (target gNB) is not occupied. If the timer (time period) expires before a handover is completed, the serving gNB assumes that the conditional handover was not successful. In such a situation, the UE device may be configured with another handover scheme if the UE device is still reachable by the serving gNB. Otherwise, the UE device may declare radio link failure (RLF), transition to IDLE mode, or go to the RRC_INACTIVE state, depending on how the UE device is configured.

At event 416, the UE device makes a decision to perform a handover. The decision may be triggered by the original conditions when the measurement report was sent or may be, at least partially, based on a change in conditions. Therefore, the threshold for triggering the measurement report for a conditional handover may be different from a conventional handover threshold. The early decision by the first base station (serving gNB) to send the conditional handover command provides the UE device with additional flexibility on when to access the target cell as compared to conventional systems. With conventional techniques, it may not be possible to send the measurement report when needed due to the required LBT procedures. Also, with traditional techniques, there may be delays in sending a handover command due to LBT procedures. With the conditional handover, the trigger to handover to the second base station (target gNB) is still based on the configured measurement threshold. Embedded within the conditional handover is another measurement threshold that may be different from the measurement threshold configured to the UE device 106 for the purposes of measurement report. The measurement threshold within the conditional handover tells the UE device at what radio signal level the UE device should trigger the handover to the target base station. Since there is a time period for performing the handover, however, the UE device is not required to send the measurement report and receive a handover command at the time when the measured signal strength requires an immediate handover. The signaling has been performed before the time the handover is required. This will also reduce the possibility of handover failures as this procedure reduces the possibility that the handover command is not received at the UE device due to either weak connection to the first base station (source gNB) or LBT failure of the channel operated by the first base station. Therefore, this allows flexibility in terms of both LBT and the configuration of the measurement threshold. Even if the measurement threshold is satisfied, LBT procedure requirements might prohibit the UE from accessing the target cell with the highest signal strength. In this case the UE may handover to another target base station that is unoccupied even if the signal strength is weaker.

At event 418, the UE device performs an LBT check. The UE device observes the unlicensed uplink channel that will be used for transmission and determines if the channel is unoccupied. The UE device may determine, for example, whether the level of measured energy in the channel is above a threshold.

When the channel is determined to be unoccupied, the UE device performs synchronization to the target gNB and accesses the target cell via the random access transmission 420 as part of the random access procedure which will also include UL resource allocation, timing alignment from the second base station. For the example, the UE device uses the target gNB's specific keys and selected security algorithms. In case the channel operated by the target gNB is occupied, the UE device may inform the source gNB of the channel occupancy measurement so that the source gNB may configure the UE device with an updated conditional handover command or to cancel the existing conditional handover command.

At event 422, the UE device performs an LBT check. The UE device observes the unlicensed uplink channel that will be used for transmission and determines if the channel is unoccupied. The UE device may determine, for example, whether the level of measured energy in the channel is above a threshold.

When the channel is determined to be unoccupied, the UE device transmits the handover complete message (RRC Connection Reconfiguration Complete message) to the second base station (target) at transmission 420 to confirm the handover along with the UE device's buffer status report or UL data to the second base station. This indicates that the handover procedure is completed and the second base station is now the source base station to the UE device.

Figure 5:
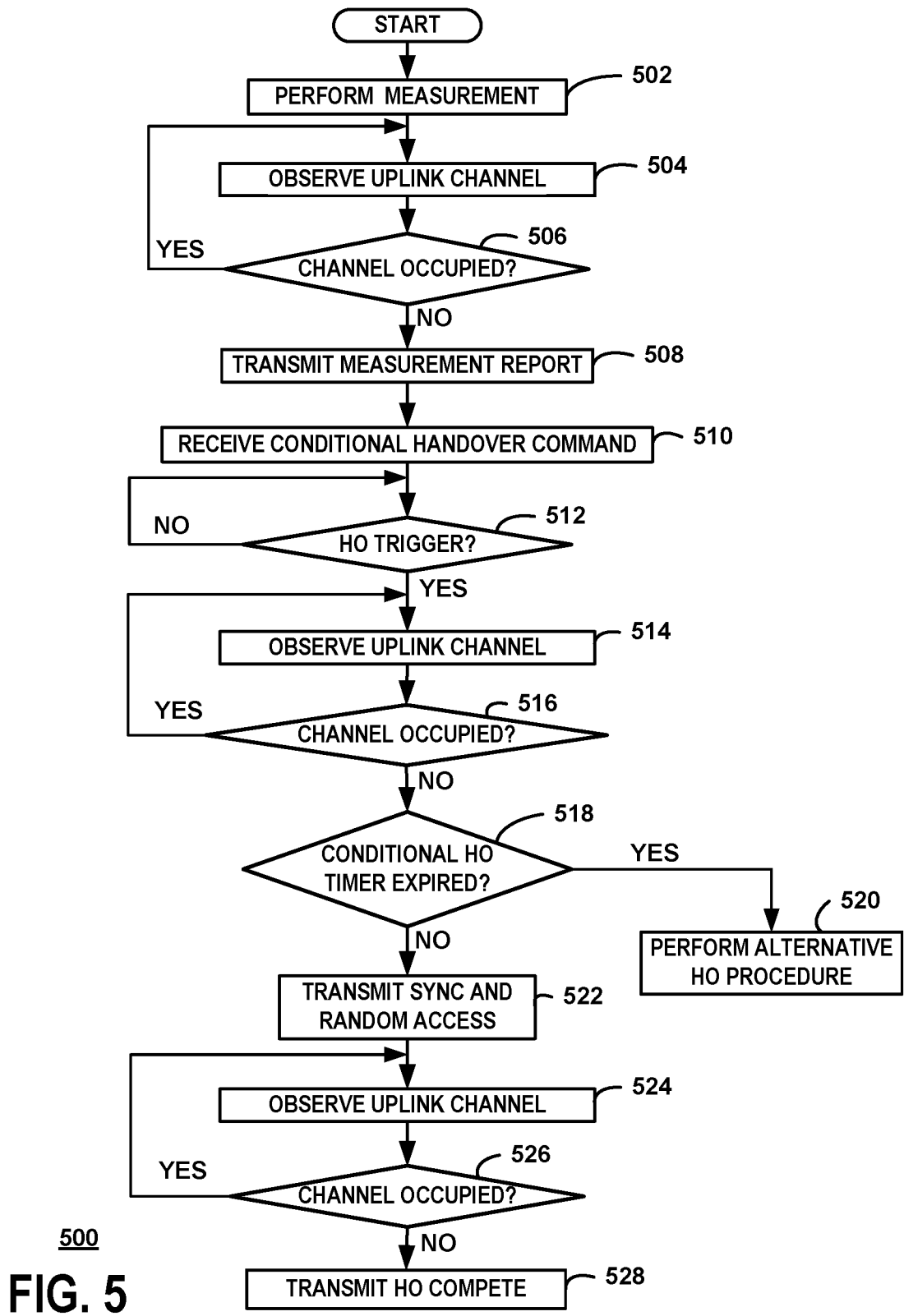
FIG. 5 is a flow chart of an example of a method of managing handovers with conditional handover commands.

FIG. 5 is a flow chart of an example of a method of managing handovers with conditional handover commands. The method is performed by a UE device operating in a NR-U SA system such as the system 100 described above. Accordingly, the method may be performed by the UE device 106.

At step 502, a measurement for generating a measurement report is made. In accordance with instructions from the serving base station (first base station), the UE device determines parameters of received signals from the serving base station and at least one target base station. For event-triggered measurement, measurement reports are only sent if the measured value(s) are above the configured thresholds. Therefore, the measurement report trigger conditions must be met before UE device in order for transmission of the measurement report. Examples of such procedures and criteria are discussed below with reference to FIG. 8.

At step 504, the unlicensed uplink channel is observed. The UE device performs an LBT process to determine if the channel is occupied.

At step 506, it is determined where the uplink channel is occupied. Based on the results measured at step 504, the UE device determines whether the channel is occupied. For example, one or more measured energy parameters of the channel may be compared to a threshold. If the channel is occupied, the UE continues to observe the channel and returns to step 504. Otherwise, the method continues to step 508. If the uplink channel continues to be occupied, the measurement performed in step 502 may no longer be valid since the UE device's current measurement may no longer be above the configured thresholds. The serving base station may configure the UE device with a condition when the previous event trigger may still be used to send the measurement report (even if the current measurement is no longer above the configured threshold). This condition may be a new timer that defines the validity time of the initial measurement report trigger. Alternatively, the condition may be defined as range value "alpha" dB below the measurement threshold. If the current measurement value is more than alpha dB below the configured threshold, the UE device does not attempt to send the measurement report even if the channel is unoccupied. In this case, the procedure will be restarted at step 502.

At step 508, the measurement report is transmitted to the first base station (serving gNB). The measurement process and the transmission of the measurement report may be triggered by conditions established by the network.

At step 510, a conditional handover command is received. As discussed above, the conditional handover command indicates that a handover is authorized for a limited time period. For the example, the conditional handover command includes a time period indicator that indicates the length of the time period. The UE device starts a conditional handover timer which has a length equal to the conditional handover time period indicated in the conditional handover command.

At step 512, it is determined whether a handover trigger has been met. The UE device observes channel conditions and determines whether the handover procedure should be performed. The UE device continues to monitor conditions if the trigger has not been met. Otherwise, the method proceeds to step 514.

At step 514, the unlicensed uplink channel to the second base station is observed.

At step 516, it is determined whether the uplink channel to the target base station (second base station) is occupied. Based on the results measured at step 514, the UE device determines whether the channel is occupied. For example, one or more measured energy parameters of the channel may be compared to a threshold. If the channel is occupied, the UE device continues to observe the channel and returns to step 514. Otherwise, the method continues to step 518.

At step 518, it is determined whether the conditional handover timer has expired. If the timer has expired, the method proceeds to step 520. If the timer has not expired, the method proceeds to step 522.

At step 520, alternate handover management procedures are performed. The alternate handover procedure may include any combination of direct and contingent steps to execute in the event the conditional handover timer expires. In some situations, the UE device may be configured with another handover scheme if the UE device is still reachable by the serving gNB. In another examples, the UE device may declare radio link failure (RLF), transition to IDLE mode, or go to the RRC_INACTIVE state. The particular procedure invoked and sequence of steps depend on the particular configuration for the UE device.

At step 522, an uplink synchronization and random access process is performed. The process begins with the synchronization to the second base station (target) via the random access procedure. The process will further include UL resource allocation and timing alignment from the target base station.

At step 524, the unlicensed uplink channel to the second base station is observed.

At step 526, it is determined whether the uplink channel to the target base station (second base station) is occupied. Based on the results measured at step 524, the UE device determines whether the channel is occupied. For example, one or more measured energy parameters of the channel may be compared to a threshold. If the channel is occupied, the UE device continues to observe the channel and returns to step 524. Otherwise, the method continues to step 528.

At step 528, a handover complete message is transmitted to the second base station. This indicates that the handover procedure is completed and the second base station is now the source base station to the UE device.

Figure 6:
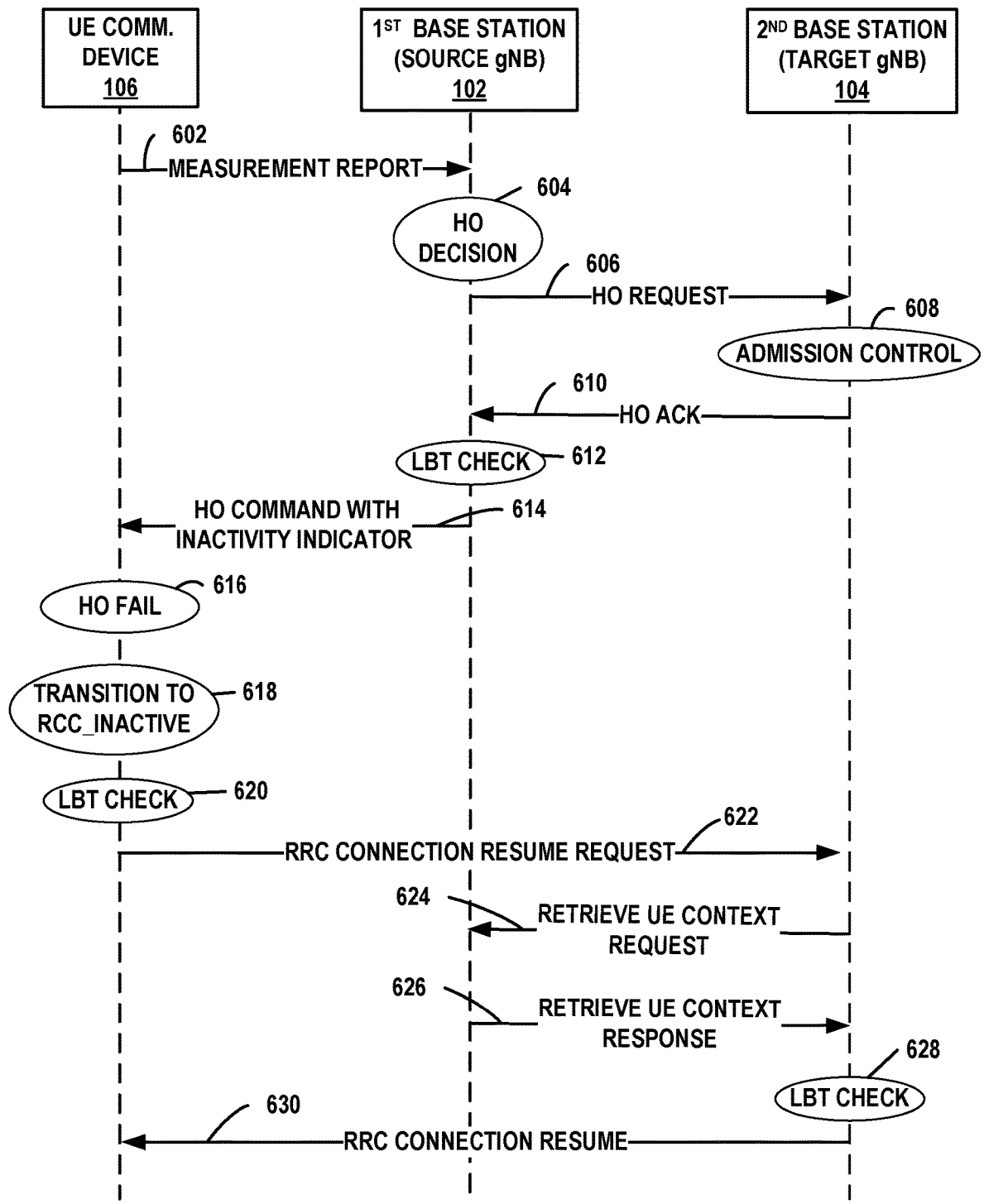
FIG. 6 is a timing diagram of communication for an example where a handover command is provided with an inactivity indicator by the first base station in a communication system utilizing unlicensed frequency bands for transmission.

FIG. 6 is a timing diagram of communication for an example where a handover command is provided with an inactivity indicator by the first base station 102 in a communication system utilizing unlicensed frequency bands for transmission. The example of FIG. 6 begins with the UE communication device 106 sending a measurement report at transmission 602. After measuring the appropriate channel parameters and determining the unlicensed uplink channel is clear, the UE device 106 sends the measurement report to the first base station 102 which is the serving base station in the example.

At event 604, the first base station 102 performs a handover decision. The source base station makes handover decision based on the measurement report and radio resource management (RRM) information.

At transmission 606, the first base station 102 sends a handover request to the second base station 104 which is the target base station. For the example, communication between the base stations is through the backhaul 105 which does not utilize the unlicensed channels.

At event 608, the second bases station performs admission control. The admission control procedure admits or rejects the establishment requests, including handovers for new radio bearers. In order to do this, admission control takes into account the overall resource situation in the network, the QoS requirements, the priority levels and the provided QoS of in-progress sessions and the QoS requirement of the new radio bearer request.

At transmission 610, the second base station sends a handover acknowledgment to the first base station. The target base station sends the handover acknowledgement after the required resources for all accepted radio bearers are allocated. If no resources are available on the target side, the target eNB responds with the handover NACK message or the handover failure message instead.

At event 612, the first base station performs an LBT procedure by observing the unlicensed downlink channel to determine if it is occupied. When the channel is unoccupied, the first base station transmits a handover command with an inactivity indicator to the UE device at transmission 614. The handover command indicates that if the handover fails due to the channel being occupied, the UE device should transition to the inactive state (RRC_INACTIVE) and then resume active status. When re-establishing active status from the inactive state, the UE device should provide the I-RNTI allocated by the last serving base station (the first base station 102) which may be used by the target base station (second base station 104) to retrieve the UE context from the last serving base station. As long as the UE device reselects a cell that is within the RNA, the target base station should be able to retrieve the UE context.

At event 616, the UE device attempts a handover that fails.

At event 618, the UE device transitions to the inactive state (RRC_INACTIVE). After entering the inactive state, the UE device transitions back to the active state.

At event 620, the UE device performs an LBT check. The UE device observes the unlicensed uplink channel that will be used for transmission and determines if the channel is unoccupied. The UE device may determine, for example, whether the level of measured energy in the channel is above a threshold.

When the channel is determined to be unoccupied, the UE device transmits the RRC connection resume request message to the second base station (target) at transmission 622. An RRC connection resume procedure is used at transition from RRC_INACTIVE to RRC_CONNECTED where previously stored information in the UE as well as in the base station is utilized to resume the RRC connection. In the message to resume, the UE provides a Resume ID (or I-RNTI) to be used by the target base station to access the stored information required to resume the RRC connection.

At transmission 624, the second base station 104 (target gNB) the requests UE context from the first base station 102 (source gNB). Inter gNB connection resumption is handled using context fetching, whereby the target gNB retrieves the UE context from the source gNB over the Xn interface by sending the Retrieve UE Context Request message. The new gNB provides the Resume ID or I-RNTI which is used by the source gNB to identify the UE context.

At transmission 626, the first base station 102 (source gNB) sends the UE context to the second base station 104 (target gNB) via the Retrieve UE Context Response message.

At event 628, the second base station performs an LBT check. The second base station device observes the unlicensed downlink channel that will be used for transmission and determines if the channel is unoccupied. The second base station may determine, for example, whether the level of measured energy in the channel is above a threshold. The second base station also may determine whether it has sufficient resource to handle the connection resume request based on the type of service and the amount of resource needed to handle the connection.

When the channel is determined to be unoccupied, the second base station transmits the RRC connection resume message to the UE device at transmission 630. In the case the UE context cannot be retrieved from the first base station (source gNB) or if the second base station cannot support the connection due to resource limitation, the second base station may send an RRC Reject message to deny the UE device's resume request, in which case the UE device will perform the fallback procedure by transitioning to RRC_IDLE. While in RRC_IDLE the UE device may initiate a new connection, but the previously established UE context information will be lost.

Figure 7:
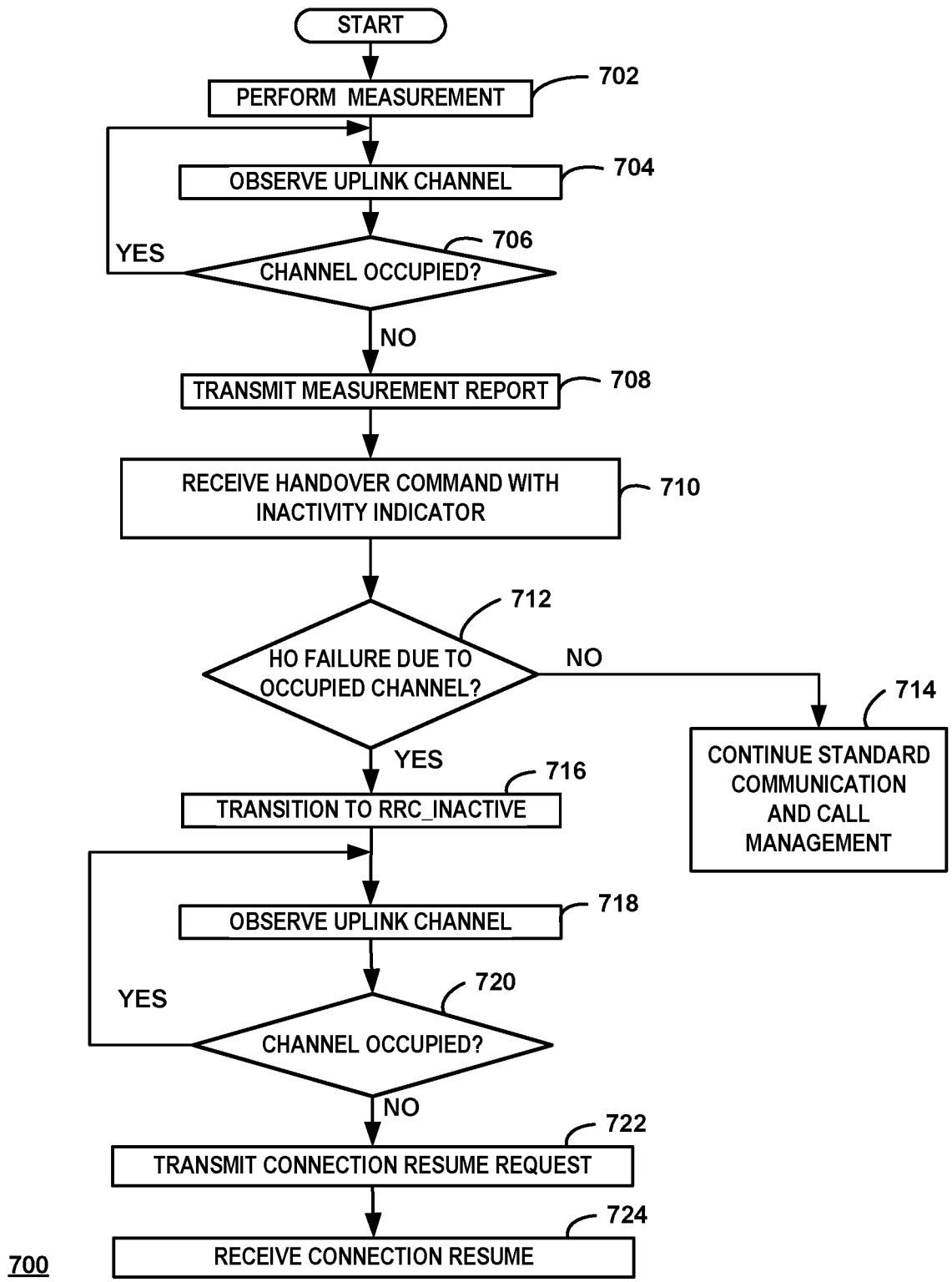
FIG. 7 is a flow chart of an example of a method of managing handovers with handover commands having inactivity indicators.

FIG. 7 is a flow chart of an example of a method of managing handovers with handover commands having inactivity indicators. The method is performed by a UE device operating in a NR-U SA system such as the system 100 described above. Accordingly, the method may be performed by the UE device 106.

At step 702, a measurement for generating a measurement report is made. In accordance with instructions from the serving base station (first base station), the UE device determines parameters of received signals from the serving base station and at least one target base station. For event-triggered measurement, measurement reports are only sent if the measured value(s) are above the configured thresholds.

At step 704, the unlicensed uplink channel is observed. The UE device performs an LBT process to determine if the channel is occupied.

At step 706, it is determined whether the uplink channel is occupied. Based on the results measured at step 704, the UE device determines whether the channel is occupied. For example, one or more measured energy parameters of the channel may be compared to a threshold. If the channel is occupied, the UE continues to observe the channel and returns to step 704. Otherwise, the method continues to step 708. If the uplink channel continues to be occupied, the measurement performed in step 702 may no longer be valid since the UE device's current measurement may no longer be above the configured thresholds. The serving base station may configure the UE device with a condition when the previous event trigger may still be used to send the measurement report (even if the current measurement is no longer above the configured threshold). This condition may be a new timer that defines the validity time of the initial measurement report trigger. Alternatively, the condition may be defined as range value "alpha" dB below the measurement threshold. If the current measurement value is alpha dB below the configured threshold, the UE will not attempt to send the measurement report even if the channel is unoccupied. In this case, the procedure will be restarted at step 702.

At step 708, the measurement report is transmitted to the first base station (serving gNB). The measurement process and the transmission of the measurement report may be triggered by conditions established by the network.

At step 710, a handover command with an inactivity indicator is received. As discussed above, the handover command with inactivity indicator indicates that the UE device should perform an inactivity and resume procedure if the handover fails due to unavailable channels.

At step 712, it is determined whether the handover failed due to the uplink channel being occupied. The UE device continues with standard communication and call management at step 714 if the handover is successful or if handover failure is due to a reason other than an occupied channel. Otherwise, the method proceeds to step 716. In some situations, the standard procedure at step 714 may include the initialization of the RRC connection re-establishment procedure towards a target base station that is considered a suitable cell.

At step 716, the UE device transitions to the inactive state. For the example, the UE device transitions to an RRC_INACTIVE state defined by one or more revisions of a 3GPP communication standard.

At step 718, the unlicensed uplink channel to the second base station is observed.

At step 720, it is determined whether the uplink channel to the target base station (second base station) is occupied. Based on the results measured at step 718, the UE device determines whether the channel is occupied. For example, one or more measured energy parameters of the channel may be compared to a threshold. If the channel is occupied, the UE device continues to observe the channel and returns to step 718. Otherwise, the method continues to step 722.

At step 722, the UE device transmits a connection resume request to the second base station (target gNB).

At step 724, the UE device receives a connection resume message from the second base station (target gNB). This indicates that the handover procedure is completed and the second base station is now the source base station to the UE device. The UE device continues with communication with the second base station as the new serving base station (source gNB).

Figure 8:
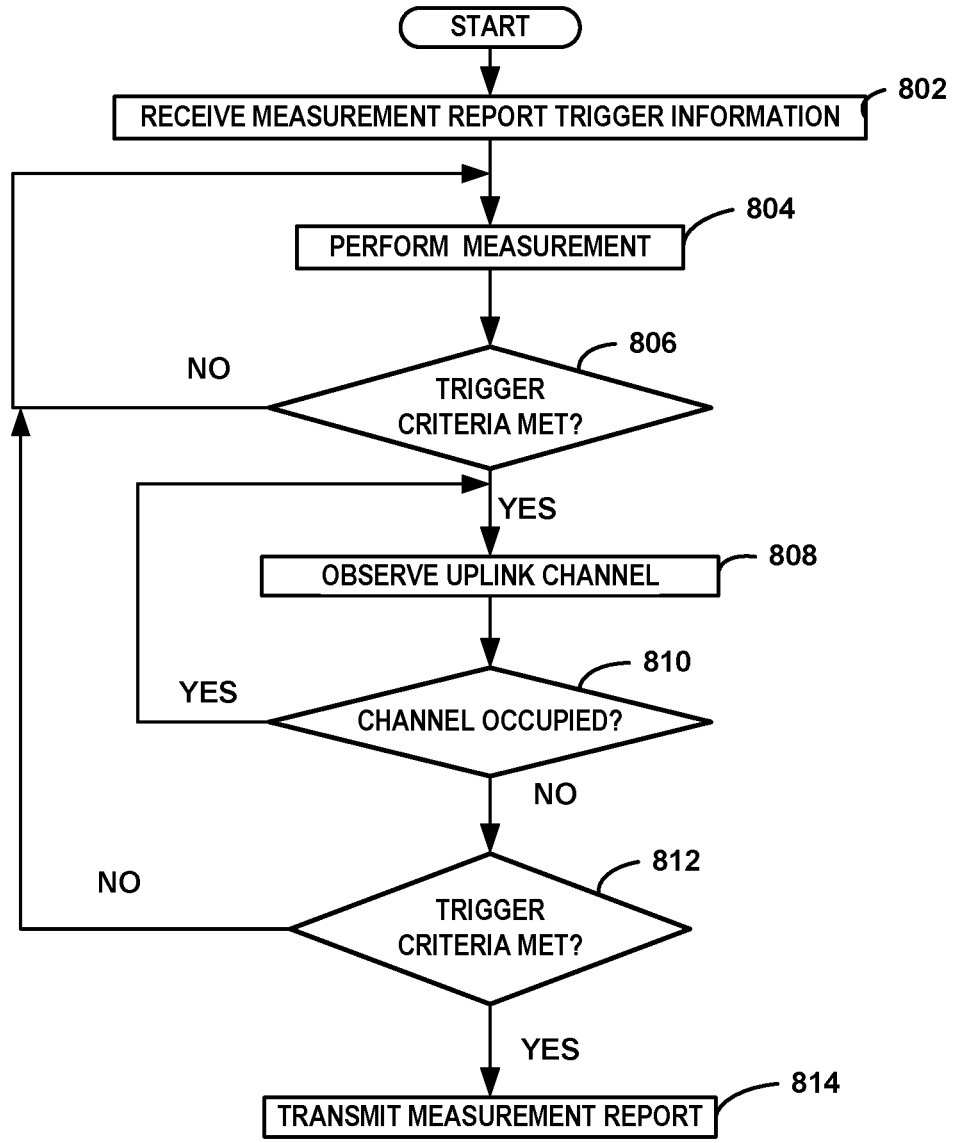

FIG. 8 is a flow chart of an example of a method of managing measurement report transmission. The method is performed by a UE device operating in a NR-U SA system such as the system 100 described above. Accordingly, the method may be performed by the UE device 106. The method is an example of performing steps 502 through 508 of the method of FIG. 5 and is an example of performing steps 702 through 708 of the method of FIG. 7.

At step 802, a measurement report trigger information is received. The source base station (source gNB) generates and transmits the measurement report trigger information which indicates to the UE device the criteria for transmitting the measurement report of the source base station. The measurement report trigger information may define thresholds for received signals. Examples of signal thresholds include a power level of received signal from non-serving base stations such as Reference Signal Received Power (RSRP) level, a quality level of received signal from non-serving base stations such as Reference Signal Received Quality (RSRQ) level, a power level of received signal from the serving base station such as RSRP level, a quality level of received signal from the serving base station RSRQ level, and any combination thereof. The measurement report trigger information may also include a threshold offset value for one or more of the threshold values where the threshold offset value may be different for each threshold. In addition, the measurement report trigger information may also include a validity timer indicating a time period from the transmission for which the measurement report trigger information will be valid.

At step 804, the channel measurement is performed. Signals are received from non-serving base station and/or serving the serving base station. Quality and/or power measurements are performed on the received signals.

At step 806, it is determined is the trigger criteria for the channel measurement is performed. The signals received from non-serving base station and/or serving the serving base station are compared to the thresholds. Other criteria, such as timers and offsets are also evaluated to determine if the criteria for transmitting the measurement report has been met. If the criteria have been met, the method continues at step 808. Otherwise, the method returns to step 804.

At step 808, the unlicensed uplink channel is observed. The UE device performs an LBT process to determine if the channel is occupied.

At step 810, it is determined whether the uplink channel is occupied. Based on the results measured at step 808, the UE device determines whether the channel is occupied. For example, one or more measured energy parameters of the channel may be compared to a threshold. If the channel is occupied, the UE continues to observe the channel and returns to step 808. Otherwise, the method continues to step 812.

At step 812, it is determined whether the measurement trigger criteria are still being met. For example, the timer period since the transmission of the measurement report trigger information may be compared to the validity timer to determine if the trigger criteria are still valid. In addition, new criteria may have been received since the measurement had been taken and the measurement must be evaluated against the new criteria. If the trigger criteria are met, the measurement report is transmitted at step 814. Otherwise, the method returns to step 804. New measurement report trigger information may be received during the process other than at step 802.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method performed at a communication device, the method comprising:
evaluating a first occupancy level of a first unlicensed channel to a serving gNB;
transmitting, in response to the first occupancy level being below a channel occupancy threshold, a measurement report over the first unlicensed channel to the serving gNB, the measurement report indicative of at least one of a received signal strength or a receive signal quality at the communication device of at least one received signal transmitted from a potential target gNB;
receiving, from the serving gNB, a conditional handover command associated with a handover time period established by the serving gNB;

evaluating a second occupancy level of a second unlicensed channel to a handover target gNB; and initiating, when a handover condition is detected and within the handover time period, a handover procedure to the handover target gNB if the second occupancy level is below the threshold.

2. The method of claim 1, further comprising:

receiving, from the serving gNB, a measurement report trigger information indicative of criteria for sending the measurement report, wherein the transmitting the measurement report comprises transmitting the measurement report only if the criteria is met, the criteria comprising a measurement report trigger threshold indicative of at least one of a minimum received signal strength threshold or a minimum received signal quality threshold.

3. The method of claim 2, the criteria further comprising a measurement report trigger validity period indicative of a time period that the measurement report trigger threshold is valid, the time period from receipt of the measurement report trigger information.

4. The method of claim 3, the criteria further comprising a threshold offset value indicative of a maximum offset below the measurement report trigger threshold after expiration of the measurement report trigger validity period.

5. The method of claim 1, further comprising:

transmitting, to the serving gNB and in response to a determination that the second occupancy level is not below the channel occupancy threshold, occupancy information indicative of the second occupancy level.

6. The method of claim 5, further comprising:

receiving, from the serving gNB, an updated conditional handover generated in response to receipt of the second occupancy level by the serving gNB.

7. The method of claim 5, further comprising:

receiving, from the serving gNB, a conditional handover cancellation message generated in response to receipt of the second occupancy level by the serving gNB.

8. The method of claim 1, wherein the measurement report is indicative of at least one of a received signal strength or a receive signal quality at the communication device of at least one received signal transmitted from the serving gNB.

9. The method of claim 1, wherein the measurement report is indicative of at least one of a Reference Signal Received Power (RSRP) level or a Reference Signal Received Quality (RSRQ) level at the communication device of the at least one received signal transmitted from the potential target gNB.

10. The method of claim 1, further comprising:

in response to failing the handover procedure within the handover time period, transitioning to a New Radio (NR) Radio Resource Control (RRC) Inactive state.

11. The method of claim 1, further comprising:

in response to failing the handover procedure within the handover time period, executing a New Radio (NR) Radio Resource Control (RRC) re-establishment procedure.

12. The method of claim 1, further comprising:

in response to failing the handover procedure within the handover time period, transitioning to a New Radio (NR) Radio Resource Control (RRC) Inactive state unless the gNB has set a re-establishment configuration; and in response to failing the handover procedure within the handover time period and having the re-establishment configuration set by the gNB, executing a NR RRC re-establishment procedure.

13. A user equipment communication device (UE device) comprising:

a receiver configured to receive a signal within a first unlicensed frequency channel to a serving gNB;

a controller configured to evaluate a first occupancy level of the first unlicensed channel to the serving gNB; and a transmitter configured to transmit, in response to the first occupancy level being below a channel occupancy threshold, a measurement report over the first unlicensed channel to the serving gNB, the measurement report indicative of at least one of a received signal strength or a receive signal quality at the communication device of at least one received signal transmitted from a potential target gNB, the receiver further configured to receive, from the serving gNB, a conditional handover command associated with a handover time period established by the serving gNB, the controller further configured to evaluate a second occupancy level of a second unlicensed channel to a handover target gNB and to initiate, when a handover condition is detected and within the handover time period, a handover procedure to the handover target gNB if the second occupancy level is below the threshold.

14. The UE device of claim 13, wherein the receiver is further configured to:

receive, from the serving gNB, measurement report trigger information indicative of criteria for sending the measurement report, wherein the transmitting the measurement report comprises transmitting the measurement report only if the criteria is met, the criteria comprising a measurement report trigger threshold indicative of at least one of a minimum received signal strength threshold or a minimum received signal quality threshold.

15. The UE device of claim 14, the criteria further comprising a measurement report trigger validity period indicative of a time period that the measurement report trigger threshold is valid, the time period from receipt of the measurement report trigger information.

16. The UE device of claim 15, the criteria further comprising a threshold offset value indicative of a maximum offset below the measurement report trigger threshold after expiration of the measurement report trigger validity period.

17. The UE device of claim 13, wherein the transmitter is further configured to:

transmit, to the serving gNB and in response to a determination that the second occupancy level is not below the channel occupancy threshold, occupancy information indicative of the second occupancy level.

18. The UE device of claim 17, wherein the receiver is further configured to:

receive, from the serving gNB, an updated conditional handover generated in response to receipt of the second occupancy level by the serving gNB.

19. The UE device of claim 17, wherein the receiver is further configured to:

receive, from the serving gNB, a conditional handover cancellation message generated in response to receipt of the second occupancy level by the serving gNB.

20. The UE device of claim 13, wherein the measurement report is indicative of at least one of a received signal strength or a receive signal quality at the communication device of at least one received signal transmitted from the serving gNB.

21. The UE device of claim 13, wherein the measurement report is indicative of at least one of a Reference Signal Received Power (RSRP) level or a Reference Signal Received Quality (RSRQ) level at the communication device of the at least one received signal transmitted from the potential target gNB.

22. The UE device of claim 13, the controller further configured to:
   transition to a New Radio (NR) Radio Resource Control (RRC) Inactive state in response to failing the handover procedure within the handover time period.

23. The UE device of claim 13, the controller further configured to:
   execute a New Radio (NR) Radio Resource Control (RRC) re-establishment procedure in response to failing the handover procedure within the handover time period.

24. The UE device of claim 13, the controller further configured to:
   in response to failing the handover procedure within the handover time period, transitioning to a New Radio (NR) Radio Resource Control (RRC) Inactive state unless the gNB has set a re-establishment configuration; and
   in response to failing the handover procedure within the handover time period and having the re-establishment configuration set by the gNB, executing a NR RRC re-establishment procedure.

* * * * *